US010356977B2

(12) United States Patent
Kulkarni et al.

(10) Patent No.: US 10,356,977 B2
(45) Date of Patent: Jul. 23, 2019

(54) ELECTRIC WALK BEHIND GREENS MOWER

(71) Applicant: Deere & Company, Moline, IL (US)

(72) Inventors: Punamchandra Kulkarni, Pune (IN); Sandip Edake, Barshi (IN); Saravanan Deenadayalan, Chengalpattu (IN); Chinmay Deshpande, Kolhapur (IN); Rajesaheb Bagwan, Bijapur (IN); Bhupesh Agrawal, Udaipur (IN); Naveen Kumar, Doddaballapur Talluk Bangalore (IN)

(73) Assignee: DEERE + Company, Moline, IN (US)

( * ) Notice: Subject to any disclaimer, the term of this patent is extended or adjusted under 35 U.S.C. 154(b) by 0 days.

(21) Appl. No.: 15/621,328

(22) Filed: Jun. 13, 2017

(65) Prior Publication Data

US 2018/0352736 A1     Dec. 13, 2018

(51) Int. Cl.
  *A01D 34/47*     (2006.01)
  *A01D 69/00*     (2006.01)
  (Continued)

(52) U.S. Cl.
  CPC .......... *A01D 34/58* (2013.01); *A01D 34/008* (2013.01); *A01D 34/46* (2013.01); *A01D 34/47* (2013.01);
  (Continued)

(58) Field of Classification Search
  CPC ...... A01D 69/02; A01D 34/47; A01D 34/006; A01D 34/69; A01D 34/78; A01D 34/58;
  (Continued)

(56) References Cited

U.S. PATENT DOCUMENTS

| 2,329,952 A | 9/1943 | Speiser |
| 2,475,671 A | 7/1949 | McCartney |

(Continued)

FOREIGN PATENT DOCUMENTS

| CN | 205408594 U | 8/2016 |
| GB | 985287 A | 3/1965 |

(Continued)

OTHER PUBLICATIONS

European Search Report issued in counterpart application No. 18171536.8 dated Nov. 7, 2018. (18 pages).

*Primary Examiner* — Robert E Pezzuto

(57) ABSTRACT

An electric walk behind greens mower includes an electric reel motor rotating a cutting reel; an electric traction motor rotating at least one traction drive roller; and an electronic control unit commanding the electric traction motor and the electric reel motor to rotate at reduced speeds during a turn if an electronic signal indicates a deviation from a normal walk speed. The electronic control unit also may determine if the actual speed of the electric traction motor is substantially less than the speed specified by a speed lever, and then command the electric reel motor and the electric traction motor to rotate at a lower speed than specified by the speed lever. The electric walk behind greens mower also may include a battery management system that activates a low voltage power supply if a key switch is turned from the off position to the run position, and that provides a start signal to an electronic control unit if the key switch is momentarily turned from the run position to the start position whereby the electronic control unit activates a high voltage power supply to the electric reel motor and the electric traction motor.

11 Claims, 12 Drawing Sheets

(51) Int. Cl.
*A01D 34/58* (2006.01)
*A01D 34/46* (2006.01)
*A01D 34/00* (2006.01)
*B60K 6/26* (2007.10)
*A01D 69/02* (2006.01)

(52) U.S. Cl.
CPC .............. *A01D 69/00* (2013.01); *A01D 69/02* (2013.01); *B60K 6/26* (2013.01); *B60W 2300/156* (2013.01)

(58) Field of Classification Search
CPC .... A01D 34/475; A01D 34/46; A01D 34/008; A01D 69/00; B60T 8/1755
USPC .............. 56/10.2 R, 10.2 H, 11.9, 10.1, 10.8
See application file for complete search history.

(56) References Cited

U.S. PATENT DOCUMENTS

| | | | |
|---|---|---|---|
| 2,972,218 A | 2/1961 | Benson | |
| 5,509,258 A | 4/1996 | Thier et al. | |
| 6,487,837 B1 * | 12/2002 | Fillman | A01D 34/58 56/11.9 |
| 6,523,334 B1 | 2/2003 | Dettmann | |
| 6,758,030 B2 | 7/2004 | Dettmann | |
| 7,007,446 B2 | 3/2006 | Dettmann | |
| 7,111,443 B2 | 9/2006 | Anderson et al. | |
| 7,168,227 B2 | 1/2007 | Derby et al. | |
| 7,367,173 B2 | 5/2008 | Daly et al. | |
| 7,448,193 B2 * | 11/2008 | Derby | A01D 34/47 56/249 |
| 7,610,738 B2 | 11/2009 | Daly et al. | |
| 7,954,308 B2 | 6/2011 | Harris | |
| 8,572,940 B2 | 11/2013 | Schmidt et al. | |
| 8,660,744 B2 | 2/2014 | Derby et al. | |
| 9,179,596 B2 * | 11/2015 | Phillips | B60T 8/1755 |
| 9,616,893 B2 * | 4/2017 | Bejcek | B60W 30/18009 |
| 2008/0184688 A1 | 8/2008 | Daly et al. | |

FOREIGN PATENT DOCUMENTS

| | | |
|---|---|---|
| JP | 2014003937 A | 1/2014 |
| WO | 2017066396 A1 | 4/2017 |

* cited by examiner

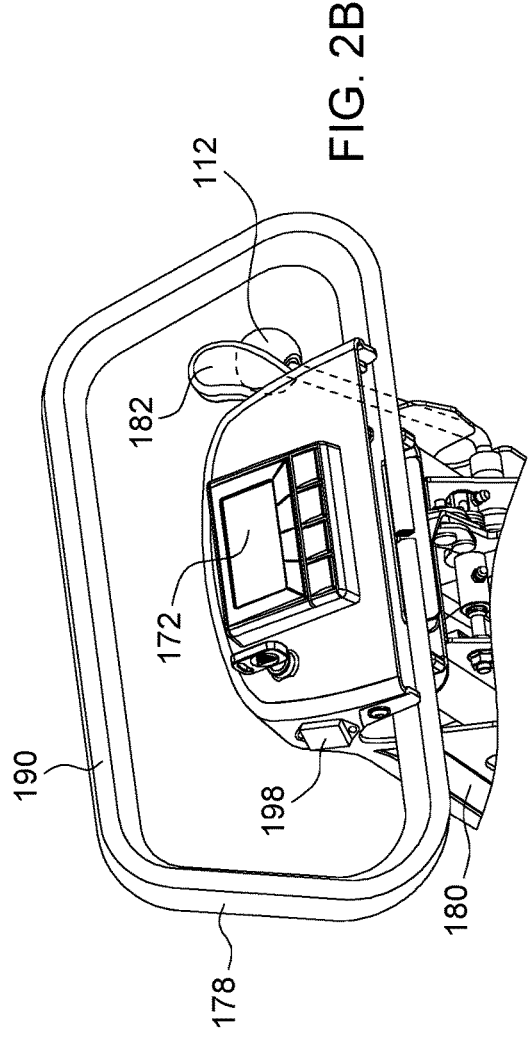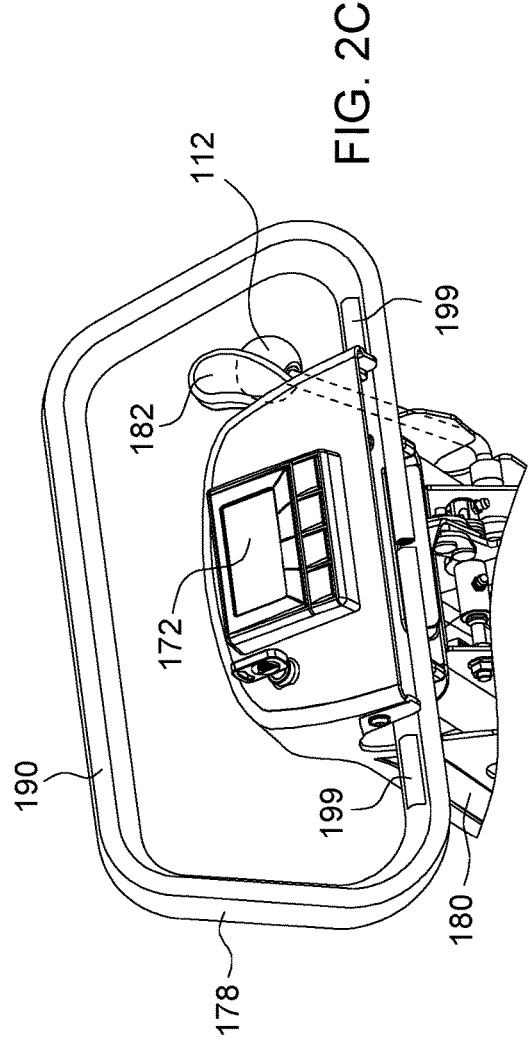

ELECTRIC WALK BEHIND GREENS MOWER

FIELD OF THE INVENTION

This invention relates to grass mowing machines and specifically to electric walk behind greens mowers.

BACKGROUND OF THE INVENTION

An electric walk behind greens mower has a horizontally aligned reel cutting unit that is designed to provide a high quality cut on golf course greens. In the past, some walk-behind greens mowers have been battery powered and/or have used electric motors to rotate the cutting reels and traction rollers or drums. For example, British Patent 985287 relates to a battery-electric mower having separate electric motors for driving the cutting reel and traction roller. Other examples of electric walk behind greens mowers include those manufactured and sold by Atco since the 1950s.

U.S. Pat. Nos. 6,523,334 and 6,758,030 for Battery-powered walk-behind greens mower relate to variable controls such as potentiometers that an operator may use to control the speed of a traction motor and a reel motor. The traction drive may be interrupted by releasing a bail which actuates a switch. The reel motor may be shut down if an electric sensor senses a predetermined low voltage in the battery. The traction or reel motors also may be shut down if sensors built into the motors sense current or heat exceeding predetermined limits. A battery cutout relay may terminate current to the reel motor through an electric contactor. Additionally, closing the key switch activates a time delay module that provides an electrical shutdown system. After a specified time period of non-operation, the time delay module removes power to the entire system.

U.S. Pat. No. 7,007,446 for Battery-powered walk-behind greens mower relates to a greens mower having a controller that communicates with a battery level indicator, card reader and operator presence control system to determine the mode of operation, and to supply or discontinue electrical current to a reel motor and/or traction motor. The controller includes an internal soft start module that limits current applied to the reel motor during start up.

U.S. Pat. No. 7,111,443 for Walk reel mower with electric drive and automatic slow down system relates to a system for automatically slowing a greens mower during turns. A switch may be actuated when the operator pushes down on the handle to lift the reel cutting unit up off the ground, causing a rearward pitching motion of the reel cutting unit. The switch is connected to a motor controller that automatically decreases power flowing from the battery to the traction motor by a predetermined increment.

U.S. Pat. No. 7,168,227 for Internal combustion engine traction drive with electric cutting unit drive for walking greens mower relates to a greens mower controller that controls the rotational speed of an electric reel motor in relation to the detected drive speed of one or more rollers.

U.S. Pat. Nos. 7,367,173 and 7,610,738 for Greens mower data display and controller relate to a mower controller coupled to a data display and controls reel speed and groundspeed. The mower controller may receive groundspeed data from the traction drive system or a sensor coupled to one or more rollers, and reel motor speed and current draw from the cutting reel and motor. The mower controller may disengage the electric motor upon detection of a current spike caused by a jam, or during motor overload or overheating. Mower controllers on several mowers may communicate with a master controller.

U.S. Pat. No. 7,954,308 for Frequency of clip adjustment system and method for reel mower cutting unit relates to a system for adjusting frequency of clip. A reel motor controller determines the required reel speed based on the walk speed, frequency of clip setting from a user interface, and one or more numerical constants specific to the reel mower cutting unit.

U.S. Pat. No. 8,572,940 for Mower with thumb wheel throttle control relates to an electric walk behind greens mower with a thumb wheel that progressively increases and decreases power output of an engine or rotates a potentiometer shaft to change the speed of an electric motor.

U.S. Pat. No. 8,660,744 for Speed control system for walk behind powered equipment relates to operator hand controls used to set the speed of a traction roller. A controller and display may be used to set minimum and maximum speeds of the traction and reel motors.

Walk behind greens mowers that use battery power for electric reel and traction motors are effective to reduce noise and minimize fluid leakage problems, but still may be difficult to operate without long experience or training. For example, walk behind greens mowers with electric traction motors may pull forward suddenly if an operator grips the bail or releases the park brake, but has not set the speed control lever or throttle to a slow or zero speed position. There is a need for an electric walk behind greens mower that cannot pull forward suddenly from a stopped position. There also is a need for an electric walk behind greens mower with an automatic slow down system that does not require lifting or pitching of the cutting reel at each turn around.

In the past, the range of most battery powered walk behind greens mowers has been limited to eight or nine greens. Improvements in battery technology may extend the range, but there also is a need to improve the electrical systems of walk behind greens mowers to extend the range even further. The electrical systems of some walk behind greens mowers do not conserve battery power effectively. For example, the pair of motor controllers on most walk behind greens mowers may consume 120 mA current at 50V, which is 6 Watts continuous power, even when the electric motors are not running. Additionally, the contactors on most walk behind greens mowers consume continuous current while the mower is on. There is a need for an electric walk behind greens mower that can extend or conserve battery power to enhance the range of the mower.

SUMMARY OF THE INVENTION

An electric walk behind greens mower includes an electric reel motor rotating a cutting reel; an electric traction motor rotating at least one traction drive roller; and an electronic control unit commanding the electric traction motor and the electric reel motor to rotate at reduced speeds during a turn if an electronic signal indicates a deviation from a normal walk speed. The electronic control unit also may determine if the actual speed of the electric traction motor is substantially less than the speed specified by a speed lever, and then command the electric reel motor and the electric traction motor to rotate at a lower speed than specified by the speed lever. The electric walk behind greens mower also may include a battery management system that activates a low voltage or 12 volt power supply if a key switch is turned from the off position to the run position, and that provides a start signal to an electronic control unit if the key switch is momentarily turned from the run position to the start position whereby the electronic control unit activates a high voltage or 48 volt power supply to the electric reel motor and the electric traction motor.

BRIEF DESCRIPTION OF THE DRAWINGS

FIG. 2B is a rear perspective view of the handle of an electric walk behind greens mower according to a second embodiment of the invention.

FIG. 2C is a rear perspective view of the handle of an electric walk behind greens mower according to a third embodiment of the invention.

DESCRIPTION OF THE PREFERRED EMBODIMENT

Figure 1:
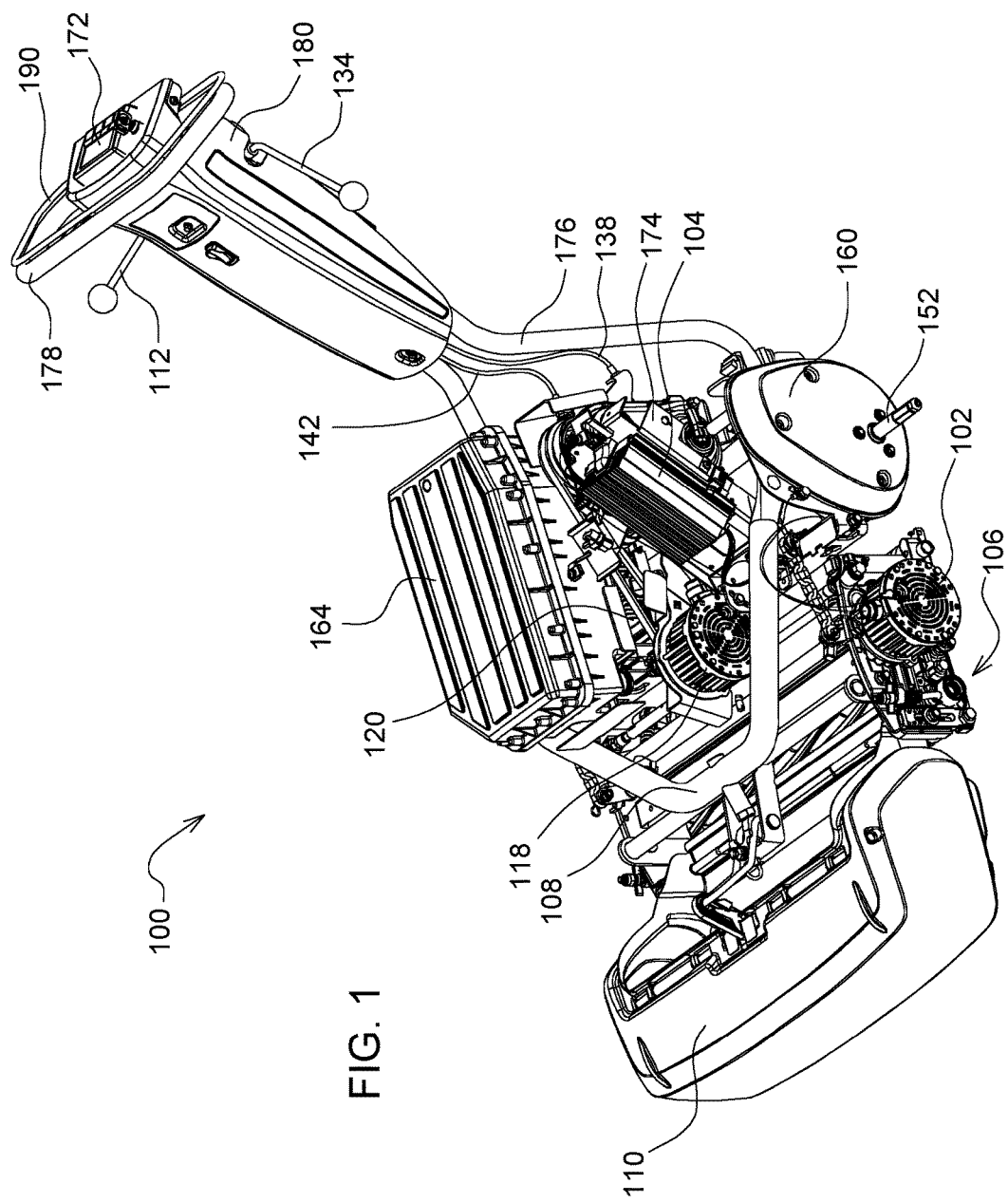
FIG. 1 is a side perspective view of an electric walk behind greens mower according to one embodiment of the invention.
Figure 2A:
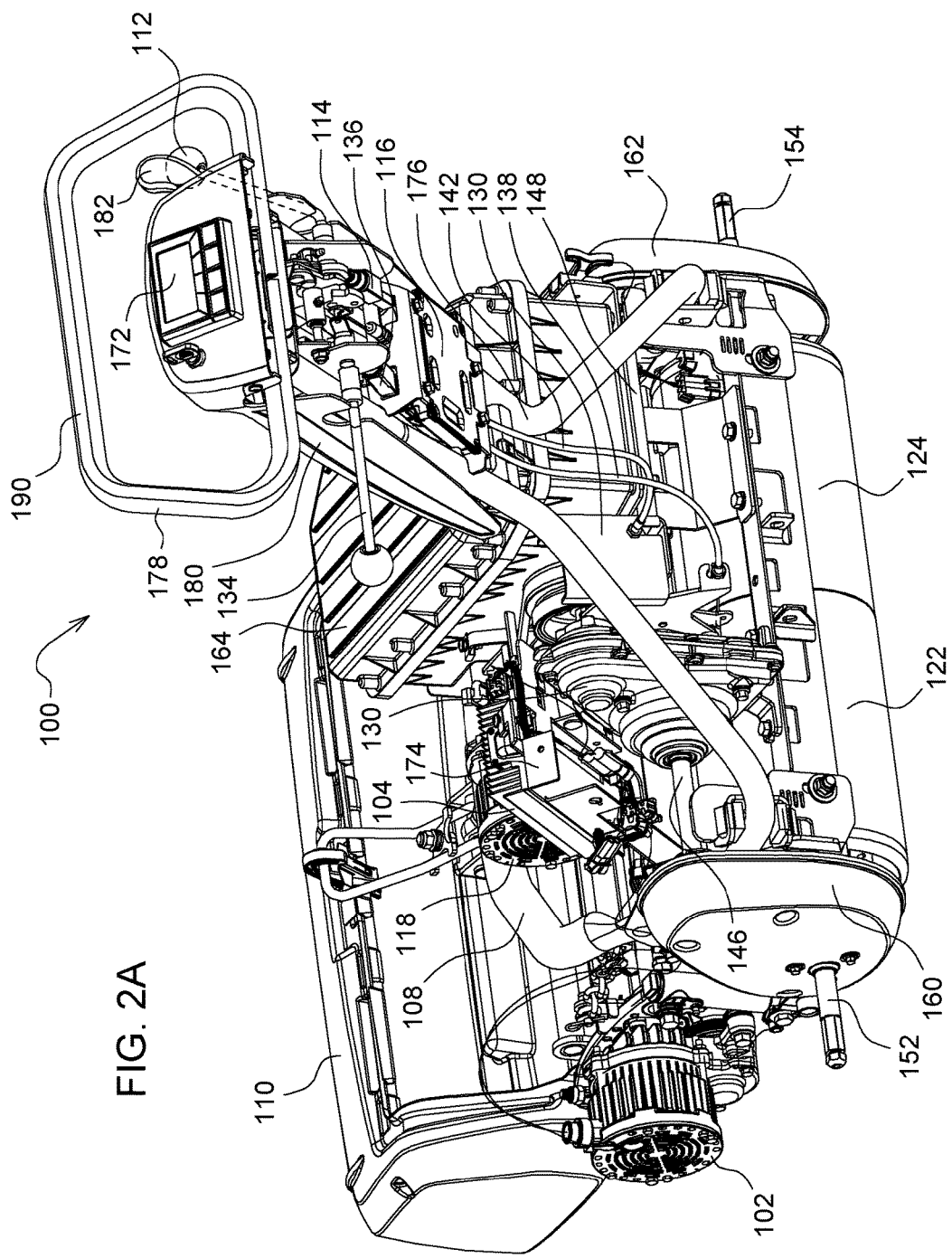
FIG. 2A is a rear perspective view of an electric walk behind greens mower according to one embodiment of the invention.

FIGS. 1 and 2A show an embodiment of electric walk behind greens mower 100 having electric reel motor 102 and reel motor controller 104 for operating reel cutting unit 106. The electric reel motor may be attached to one side of the reel cutting unit and may rotate spiral blades about a generally horizontal and laterally extending axis. Yoke 108 may extend forwardly of the reel cutting unit, pulling the reel cutting unit during mowing operations, and supporting grass catcher 110 in front of the reel cutting unit. Electronic control unit 116 may provide commands to reel motor controller 104 specifying the speed of electric reel motor 102.

Figure 3:
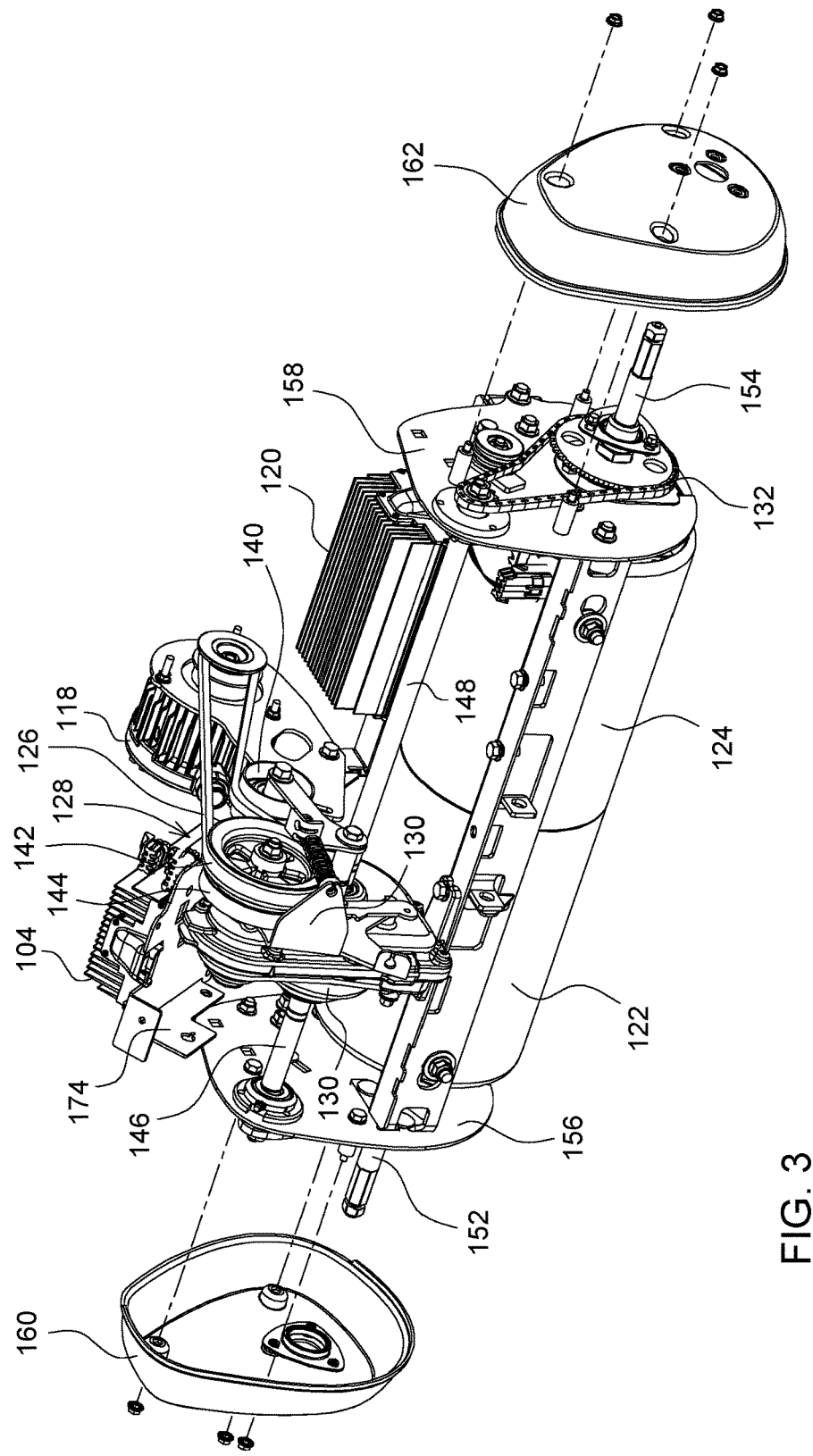
FIG. 3 is a front perspective view of an electric traction motor and traction motor controller for operating a pair of traction drive rollers of an electric walk behind greens mower according to one embodiment of the invention.

In one embodiment, electric walk behind greens mower 100 may have electric traction motor 118 and traction motor controller 120 for operating a pair of traction drive rollers 122, 124. As shown in FIG. 3, electric traction motor 118 may be positioned above the traction drive rollers and may engage the traction drive rollers through belt 126, clutch assembly 128, differential/gear case assembly 130 and chain drives 132, 133. The differential/gear case assembly may include a pair of output shafts 146, 148. The pair of output shafts may engage chain drives 132, 133 to rotate axles 152, 154 and rollers 122, 124. The chain drives may be housed between plates 156, 158 and covers 160, 162.

Figure 4:
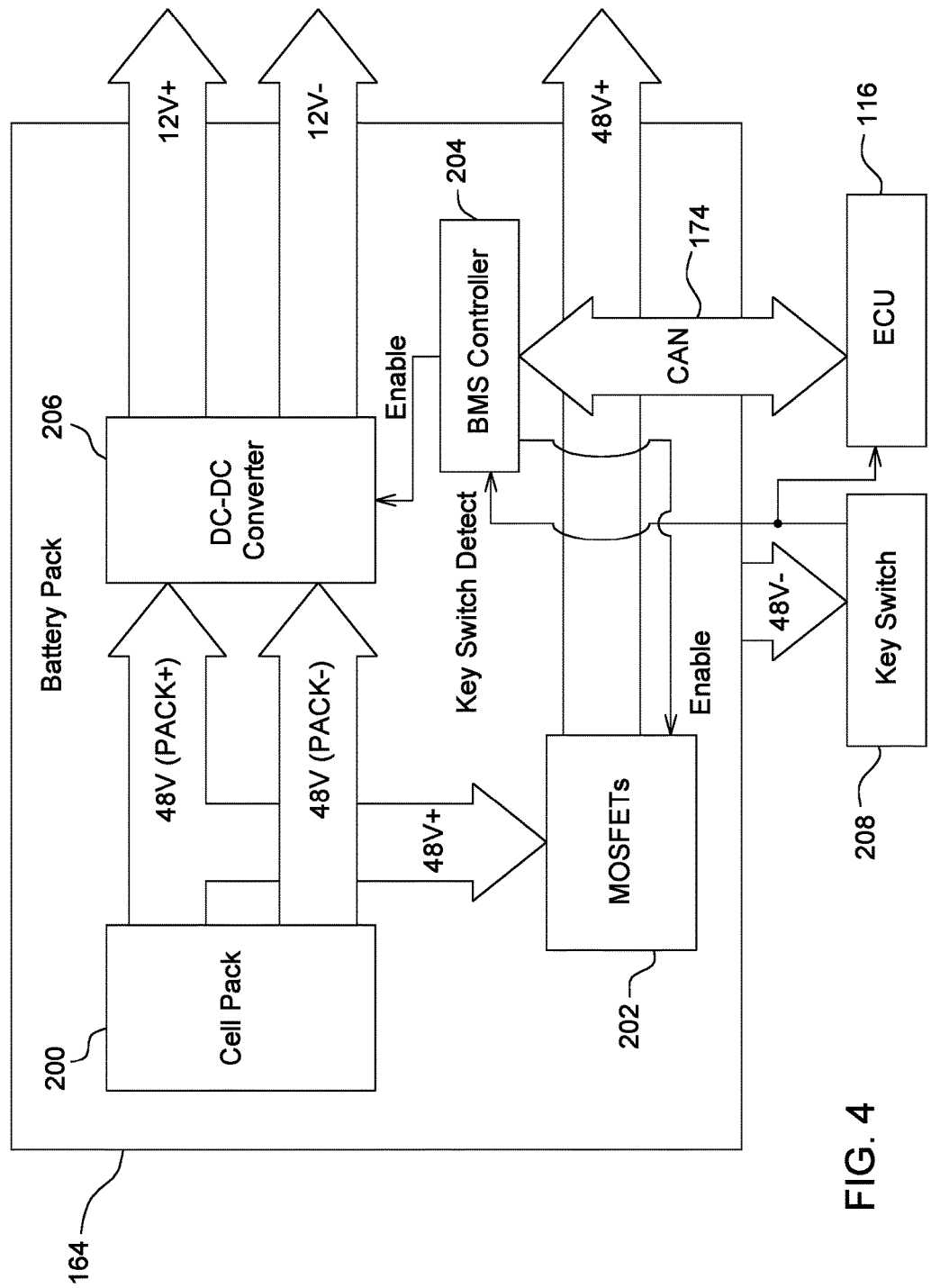
FIG. 4 is a schematic drawing of a battery pack of an electric walk behind greens mower according to one embodiment of the invention.
Figure 5:
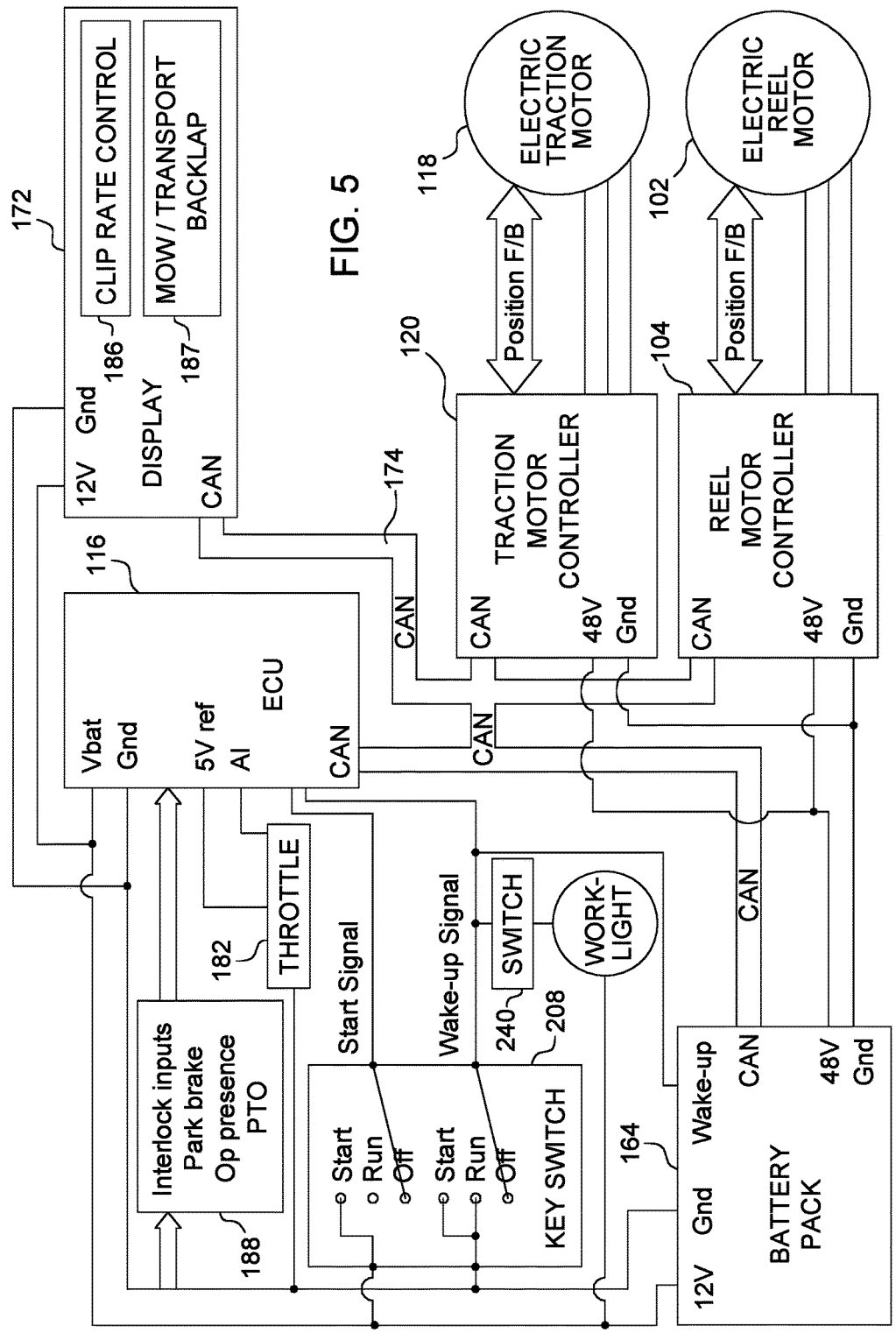
FIG. 5 is a schematic drawings of an electrical system of an electric walk behind greens mower according to one embodiment of the invention.

In an embodiment shown in FIGS. 4-5, electric walk behind greens mower 100 may include battery pack 164. Battery pack 164 may include battery core or cell pack 200, battery management system (BMS) 204 with DC-DC converter 206, and electrical connectors. Battery core or cell pack 200 may include a number of cells electrically connected in a series/parallel configuration and shall supply a low voltage power supply (e.g., 12V, 6 A output voltage) and a high voltage power supply (e.g., nominal 48V DC bus output). Battery pack 164 may include a connector for 48V for power bus and charging, and a 12V and CAN connector. BMS 204 may include an electronic controller or microprocessor that uses logic to handle connection and disconnection of the battery pack's 48V and 12V outputs in coordination with electronic control unit 116. The BMS also may provide battery status to electronic control unit 116. The BMS may include a charging mode in which a charger is connected to the battery pack. To detect charger connection and wake up from the same, the BMS may have its own internal power supply that does not depend on the state of the 12V and 48V outputs. The BMS also may not turn on 12V until a wake up signal from the key switch is received. If the BMS receives a run signal (active low input) from the key switch and the BMS is already awake in charging mode, the BMS may turn on the 12V and start CAN bus communication. The CAN bus communication may include detecting if the 48V output is connected to the reel and traction motor controllers. The BMS may use MOSFETs 202 for electrically connecting cell pack 200 and the battery pack's 48V output to the reel and traction motor controllers. The BMS also may receive CAN bus messages every 20 ms from the electronic control unit, and may switch off the 48V supply if a message from the VCU is not received for 500 ms.

In one embodiment, battery pack 164 does not include any contactors that would consume continuous power while the electric walk behind greens mower is on. Battery pack 164 may be connected to key switch 208 having an off position, a run position and a start position. If the operator turns key switch 208 from the run position to the off position, battery pack 164 may provide a shut-down signal detected by electronic control unit 116 and BMS controller 204. The shut-down signal may be an inactive digital input. In response to the shut-down signal, electronic control unit 116 may send shut-down commands via CAN bus 174 to display 172, reel motor controller 104 and traction motor controller 120. Electronic control unit 116 then may wait for a responsive signal back from the motor controllers in response to the shut-down message. Once the electronic control unit receives the response, the electronic control unit 116 may send a shut-down command via CAN bus 174 to BMS 202. This shut-down command will cause the BMS to turn off MOSFETs 202 for the 48V supply, wait for a signal from the battery management system to make sure the 48V supply is turned off, and then disable DC-DC converter 206 for the 12V supply, and cause battery pack 164 to go into the sleep mode.

In one embodiment, if the operator turns key switch 208 from the off position to the run position, battery pack 164 may provide a wake-up signal that may be detected by electronic control unit 116 and BMS 202. The wake-up signal may be an active low type of digital input. In response to the wake-up signal, BMS 202 may enable DC-DC converter 206 for the low voltage, 12V power supply, electronic control unit 116 will get powered on, and/or then display 172 will get powered on.

In one embodiment, if the operator turns key switch 208 momentarily from the run position to the start position, key switch 208 may provide a start signal that may be detected by electronic control unit 116. The start signal may be an active high type of signal. In response to the start signal, electronic control unit 116 may send a command via CAN bus 174 to BMS controller 204 to activate the high voltage, nominal 48V supply. BMS controller then may enable a driver to turn on MOSFETs 202 to activate the 48V power supply, providing power to reel motor controller 104 and traction motor controller 120.

In one embodiment, the electronic control unit may provide a signal via CAN bus 174 to BMS controller 204 to turn off MOSFETs 202 and the 48V output under certain conditions. For example, the electronic control unit may receive signals via CAN bus from one or both motor controllers 104, 120 indicating the electric traction and reel motors have not run for at least a pre-defined time period, or indicating that cell pack 200 may be in a battery charging state. In each case, the electronic control unit may send a signal over the CAN bus to BMS controller to turn off the MOSFETs and disable 48V output to the motor controllers.

In one embodiment, electric walk behind greens mower 100 may include speed lever 182 mounted to an upper rear portion of handlebar 176. Speed lever 182 may be electrically connected to battery pack 164 and electronic control unit 116. Speed lever 182 may include a potentiometer or other device that that may provide a variable resistance or voltage signal based on the speed lever position, along with a reference voltage such as 5V, to electronic control unit 116. The electronic control unit may use the variable voltage signal from the speed lever to provide output signals to traction motor controller 120 for electric traction motor 118. For example, the electronic control unit may provide motor speed commands via the CAN bus to the traction motor controller.

In one embodiment, electric walk behind greens mower 100 may include display 172 connected to 12V power supply of battery 164 and to electronic control unit 116 via CAN bus 174. Display 172 may include variable clip rate control 186. Electronic control unit 116 may use the clip rate control setting, throttle lever setting, number of reel blades, and a gearbox constant, to calculate required reel speed. Electronic control unit 116 may provide signals via CAN bus 174 to reel motor controller 104 to run electric reel motor 102 at the required reel speed for the ground speed. The display may include operator settings for the reel motor for mowing, and for reversing reel motor rotation for backlap.

In one embodiment, electric walk behind greens mower 100 may include a plurality of interlocks 188 including operator presence sensor 190, park brake lever 134 and PTO switch 113. Each interlock may be electrically connected to 12V power supply of battery 164 and electronic control unit 116. For example, operator presence sensor 190 may be a pivotable bail mounted to handlebar 176 adjacent handle 178. Operator presence sensor 190 may be connected to cable 142 that pivots idler 140 to engage and disengage belt 126 from traction drive clutch assembly 128, and may actuate plunger switch 114 to turn on and off the electric traction drive motor. Clutch lever 112 also may be connected to cable 142 that pivots idler 140 to engage and disengage belt 126 from traction drive clutch assembly 128, and also may actuate plunger switch 114 to turn on and off the electric traction drive motor. The operator presence sensor and clutch lever may be mechanically interlocked. Park brake lever 134 may be connected to cable 138 used to tighten brake band 144. Park brake lever 134 also may actuate plunger switch 136. Park brake lever 134 may be engaged only when the traction motor clutch is disengaged and the electric traction motor is off. PTO switch 113 may be used to turn on and off the electric reel motor. Plunger switches 114 and 136 may be connected to the electronic control unit and may provide interlocks for starting and stopping the traction and reel motors. CAN messages may be sent to command both motor controllers based on the position of these plunger switches.

Figure 6:
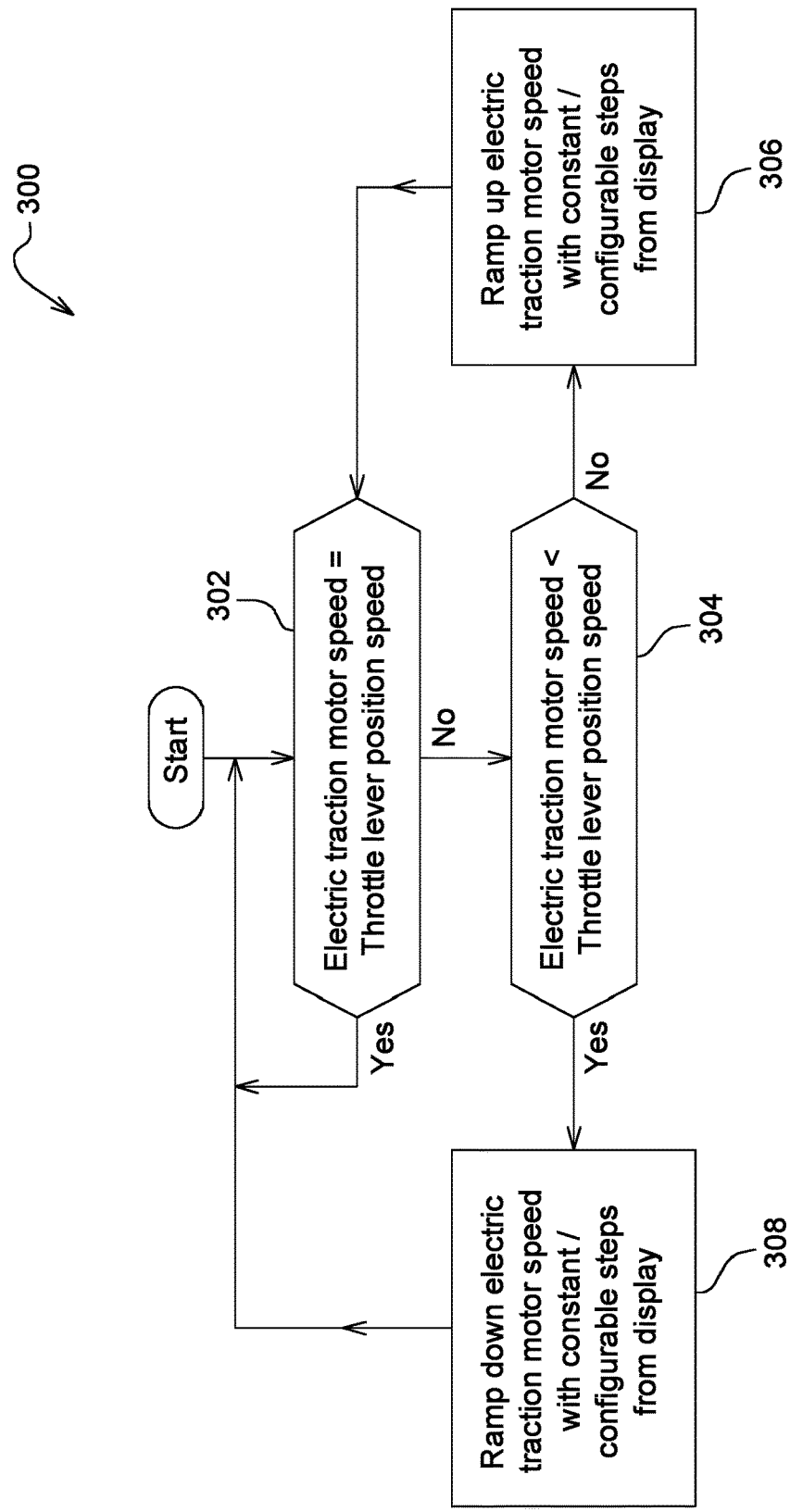
FIG. 6 is a logic diagram of a speed ramp up system on an electric walk behind greens mower according to one embodiment of the invention.

FIG. 6 is a logic diagram of speed ramp up system 300 on an electric walk behind greens mower. Speed ramp up system 300 may be implemented with software and/or logic in electronic control unit 116, and the electronic control unit may provide commands via the CAN bus to traction motor controller 120, and to reel motor controller 104. More specifically, electronic control unit 116 may specify how the actual traction motor speed and actual reel motor speed may ramp up or down in steps or increments, In block 302, electronic control unit 116 may compare actual traction motor speed via the CAN bus from traction motor controller 120, to the speed setting of speed lever 182. If actual traction motor speed is the same or substantially the same as the speed lever setting, the electronic control unit may return to block 302 without making a speed adjustment. If actual traction motor speed is less than the speed lever setting, the electronic control unit may command the traction motor controller to ramp up traction motor speed in steps, as shown in block 306. At the same time, the electronic control unit may command the reel motor controller to ramp up reel motor speed in corresponding steps. If actual traction motor speed is more than the speed lever setting, the electronic control unit may command the traction motor controller to ramp down traction motor speed (and reel motor speed) in steps, as shown in block 308. In either case, the electronic control unit may use one or more stored constants to determine the number of steps and speed change for each step, or may use the number of steps and speed change specified by operator input using display 172. The speed ramp up system may operate whenever the speed command changes.

Figure 7:
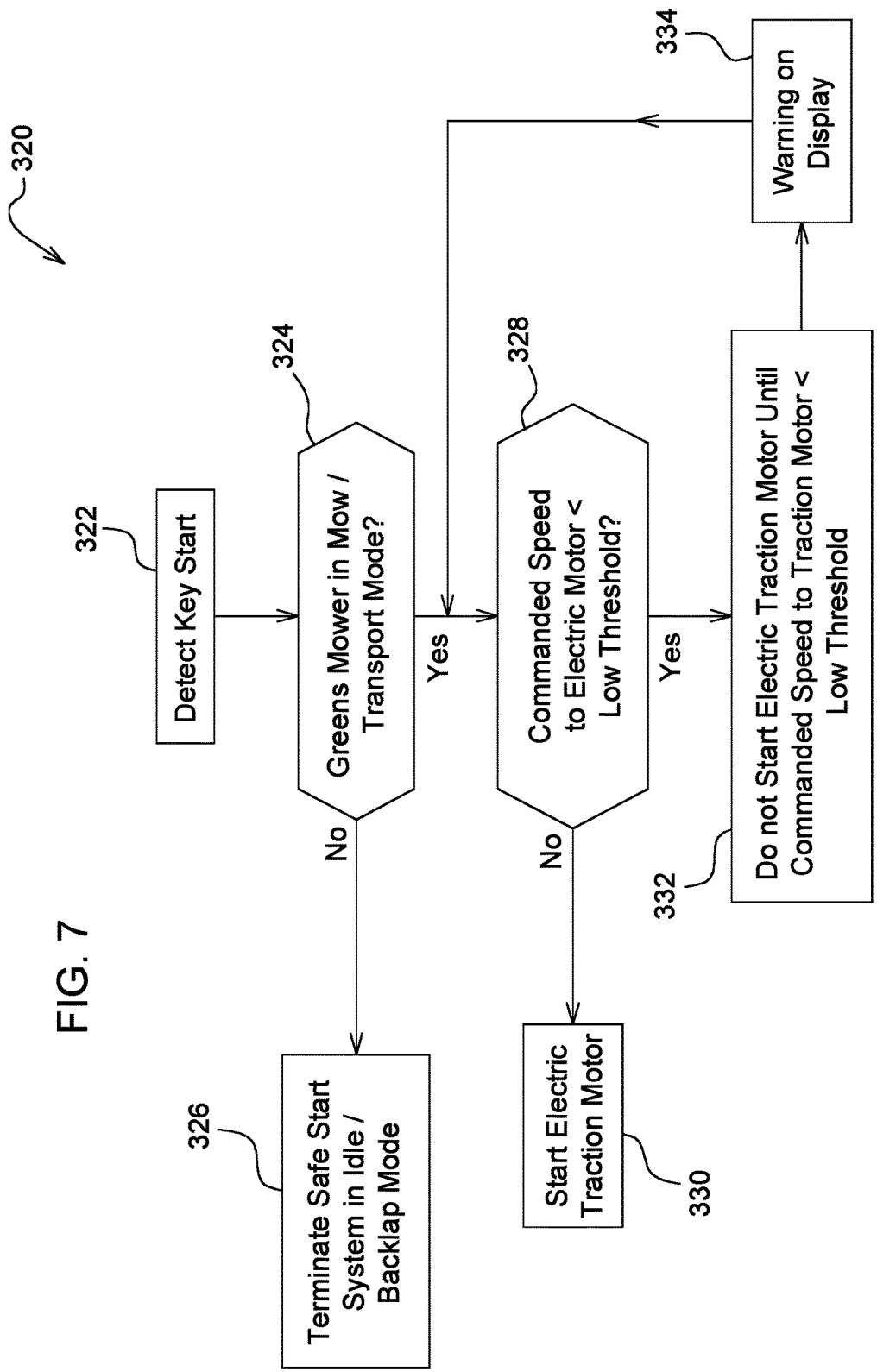
FIG. 7 is a logic diagram of throttle safe start system on an electric walk behind greens mower according to one embodiment of the invention.

FIG. 7 is a logic diagram of safe start system 320 on an electric walk behind greens mower. Safe start system 320 may be implemented with software and/or logic in electronic control unit 116, and the electronic control unit may provide commands via CAN bus to traction motor controller 120 and/or display 172. Electronic control unit 116 may use the safe start system to prevent rotation of the electric traction motor unless the traction motor speed specified by the operator is at or below a specified low threshold speed. The safe start system requires the operator to move the speed lever 182 to a slow speed position before starting the electric traction drive motor. The electronic control unit may use a stored value for the low threshold speed, or the low threshold may be specified by operator input on the display. In block 322, electronic control unit 116 may detect if the ignition switch is in the run position. In block 324, electronic control unit 116 may determine if the electric walk behind greens mower is in the mow or transport mode based on the position of the PTO lever. If the electronic control unit determines the greens mower is not in the mow or transport mode, the electronic control unit may terminate the safe start system in block 326 while the greens mower is in the idle or backlap mode. If the electronic control unit determines the electric walk behind greens mower is in the mow or transport mode, the electronic control unit may determine if the commanded traction motor speed of the speed lever is greater than a specified low threshold speed in block 328. If the commanded traction motor speed is not greater than a specified low threshold speed, the electronic control unit may provide a signal via CAN bus to the traction motor controller to start the electric traction motor in block 330. If the commanded traction motor speed is greater than the low threshold, the electronic control unit may provide a command via the CAN bus to the traction motor controller not to start the traction motor in block 332. In block 334, the electronic control unit also may send a warning or message via CAN bus to display 172. The electronic control unit then may return to block 328.

Figure 8:
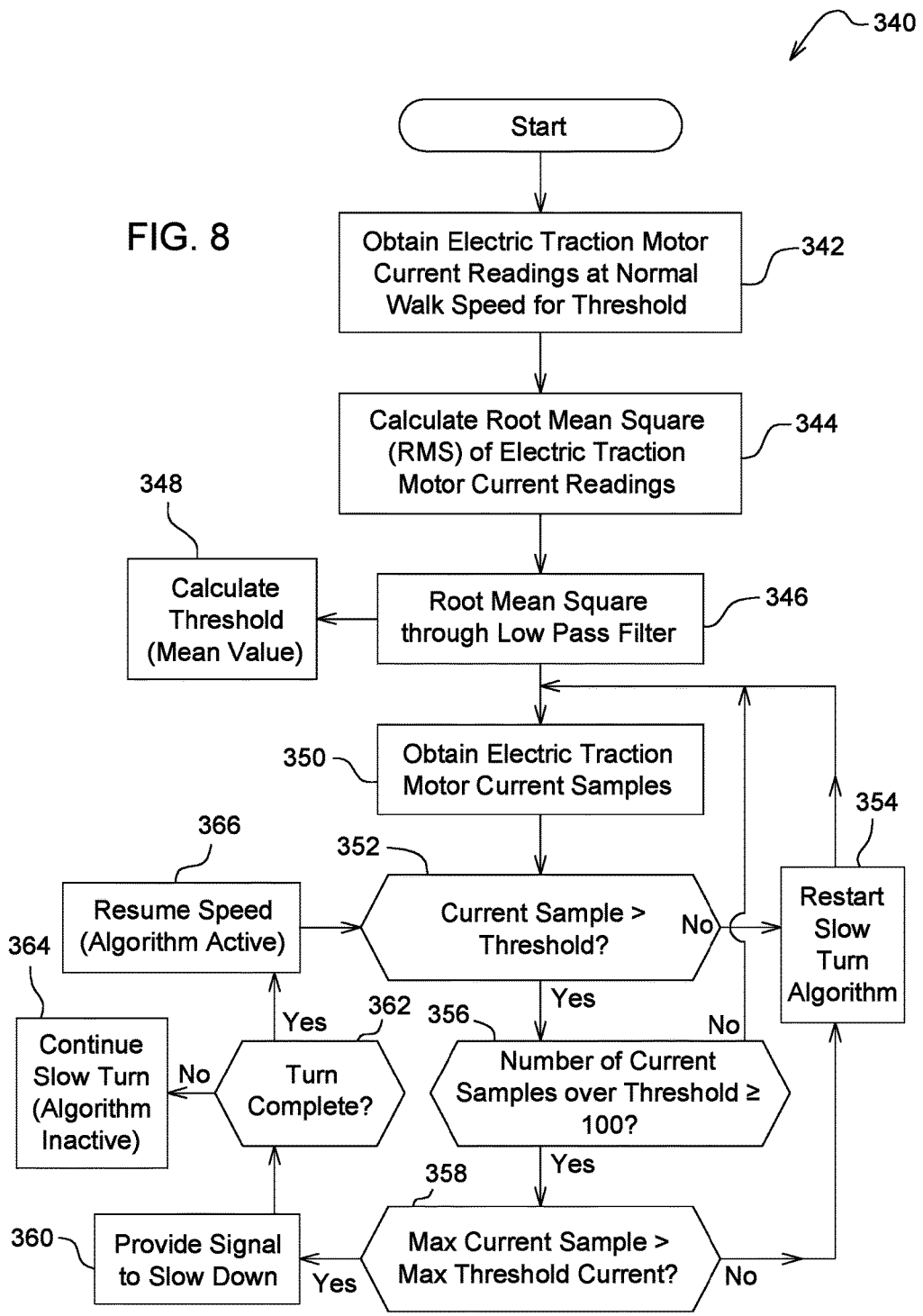
FIG. 8 is a logic diagram of an automatic slow down system using electric motor current sensors on an electric walk behind greens mower according to one embodiment of the invention.

In one embodiment, electric walk behind greens mower 100 may have an automatic slow down system 340 with electric traction motor current sensors so that an operator may slow down and turn around the greens mower without lifting or pitching of reel cutting unit 106. The automatic slow down system may be implemented with software and/or logic in electronic control unit 116. The automatic slow down system may be used only when the cutting reel is engaged in the mowing mode, and may be automatically disabled in the transport mode. The electronic control unit may provide commands to the motor controllers to reduce the electric traction motor speed and reduce reel motor speed in response to electrical signals indicating any deviations from the specified or normal walk speed of the greens mower. For example, deviations from the specified or normal walk speed may be spikes in electric current through electric traction motor 118. FIG. 8 is a logic diagram of the automatic slow down system using electric motor current sensors. In block 342, the electronic control unit may obtain multiple electric traction motor current readings to determine a threshold current at normal walk speed without slow downs or turns. The electronic control unit may obtain current readings from an inverter of the electric traction motor at intervals such as 500 usec. Electric current through the electric traction motor may be within a relatively narrow band or range at normal walk speed. For example, the average or mean of electric current consumption of the electric traction motor may be between about 6 A and about 8 A at a walk speed of 3.4 mph. In block 344, the electronic control unit may calculate the root mean square of the electric traction motor current readings. In block 346, the electronic control unit may pass the root mean square of current readings through a low pass filter. In block 348, the electronic control unit may calculate the threshold or mean value of traction motor current. After the electronic control unit determines the threshold current, the electronic control unit then may start obtaining electric traction motor current samples in block 350. The electronic control unit may determine if each sample is greater than the threshold current in block 352. For example, a current sample may spike up above 9.5 A to 10 A if the operator pulls back on handle 150 and/or slows down the greens mower without lifting or pitching the reel mower cutting unit. If a current sample is not greater than the threshold, the electronic control unit may restart the slow turn algorithm in block 354. If the current sample is greater than the threshold, the electronic control unit may determine if the number of samples exceeding the threshold is greater than or equal to a selected number such as 100, in block 356. Then, in block 358, the electronic control unit may determine if the maximum current sample is greater than a maximum threshold current value that may be up to about 50% above the 9.5 A to 10 A threshold If the maximum current sample is not greater than the maximum threshold current, the electronic control unit may return to block 354 and restart the slow turn algorithm. If the maximum current sample is greater than the maximum threshold current, in block 360 the electronic control unit may send a slow down signal on the CAN bus to the electric traction motor controller. For example, the slow down signal may be a set value such as about 40% of the set rpm. As the traction motor speed slows down, the reel motor speed also slows down to maintain a consistent clip rate. In block 362, the electronic control unit may determine if the turn is complete. For example, the electronic control unit may determine the turn is complete after a specified time period such as 2.5 seconds. Alternatively, the electronic control unit may receive electronic signals from angle sensors indicating if the turn around is complete. If the turn is not complete, the electronic control unit may continue providing the slow turn signal in block 364 while the slow turn algorithm is inactive. If the turn is complete, the electronic control unit may provide a signal on the CAN bus to the traction motor controller to resume the normal walk speed in block 366, and reactivate the slow turn algorithm.

Figure 9:
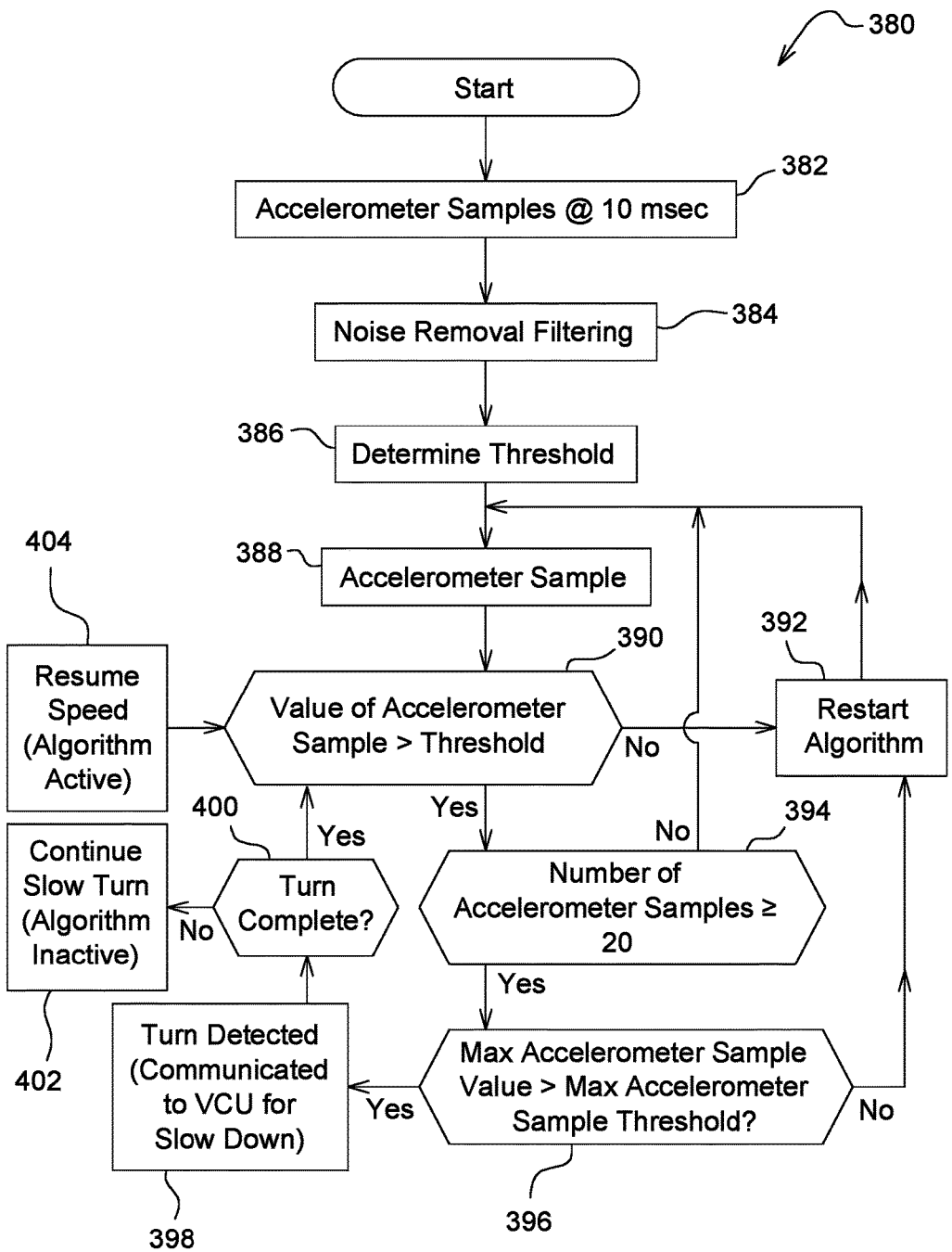
FIG. 9 is a logic diagram of an automatic slow down system using accelerometers on an electric walk behind greens mower according to one embodiment of the invention.

In a second embodiment shown in FIG. 2B, electric walk behind greens mower 100 may have an automatic slow down system with one or more accelerometers 198. The accelerometers provide electrical signals to the electronic control unit indicating any deviations from the specified or normal walk speed, such as when the operator starts to slow down and turn around the greens mower without lifting or pitching of reel cutting unit 106. The automatic slow down system may be implemented with software and/or logic in electronic control unit 116. The electronic control unit may command the motor controllers to reduce the electric traction motor speed and reel motor speed in response to spikes provided from one or more accelerometers 198 mounted on the handle of the greens mower, or at other locations on the greens mower, and electrically connected to the electronic control unit. FIG. 9 is a logic diagram of the automatic slow down system using accelerometers. In block 382, the electronic control unit may obtain accelerometer readings at intervals such as 10 msec. For example, a typical or average accelerometer reading on an electric walk behind greens mower handle may be about 0.85 g at a walk speed of 3.4 mph. In block 384, the electronic control unit may filter the accelerometer readings to remove noise. In block 386, the electronic control unit may determine a threshold or mean accelerometer value at normal walk speed without slow downs or turns. The threshold or mean may be stored in the electronic control unit or may be set by the operator using the display. After the electronic control unit determines the threshold accelerometer value, the electronic control unit may start taking accelerometer samples in block 388. The electronic control unit may determine if the accelerometer sample is greater than the threshold in block 390. For example, an accelerometer sample may be above about 1.50 g or below about −1.00 g if the operator pulls back on handle 178 and/or slows down the greens mower without lifting or pitching the reel mower cutting unit. If the electronic control unit determines the accelerometer sample is within the threshold, the electronic control unit may restart the algorithm in block 392. If the electronic control unit determines the accelerometer sample is far off the threshold, either positive or negative, in block 394 the electronic control unit may determine if the number of samples that are far off the threshold has reached a selected number such as 10. If less than 10 samples are far off the threshold, the electronic control unit may return to block 388. If at least 10 samples are far off the threshold, the electronic control unit may determine if the maximum accelerometer sample is significantly off the maximum threshold in block 396. For example, the maximum threshold may be about 50% over the threshold value. If the maximum accelerometer sample is not significantly off the maximum threshold, the electronic control unit may restart the algorithm in block 392. If the maximum accelerometer sample is significantly off the maximum threshold, in block 398 the electronic control unit may send a slow down signal on the CAN bus to the electric traction motor controller and reel motor controller. The slow down may be a fixed value or percentage such as 40% of the rpm. In block 400, the electronic control unit may determine if the turn is complete. For example, the electronic control unit may determine the turn is complete after a fixed time period such as 2.5 seconds. Alternatively, the electronic control unit may receive electronic signals from angle sensors indicating if the turn around is complete. If the turn is not complete, the electronic control unit may continue providing the slow down signal in block 402 while the slow turn algorithm is inactive. If the turn is complete, the electronic control unit may provide a signal on the CAN bus to the traction motor controller to resume the normal walk speed in block 404, and reactivate the slow turn algorithm.

In an alternative embodiment, electric walk behind greens mower 100 may have an automatic slow down system that includes a combination of current sensing of the electric traction motor and one or more accelerometers. The automatic slow down system may be implemented with software and/or logic in electronic control unit 116. The electronic control unit may command the motor controllers to reduce the electric traction motor speed and reel motor speed in response to a combination of current spikes from the electric traction drive motor and spikes from one or more accelerometers. Additionally, the electronic control unit may automatically disable the automatic slow down system in the transport mode instead of the mowing mode, or the display may include a switch that an operator may use to disable the system.

Figure 10:
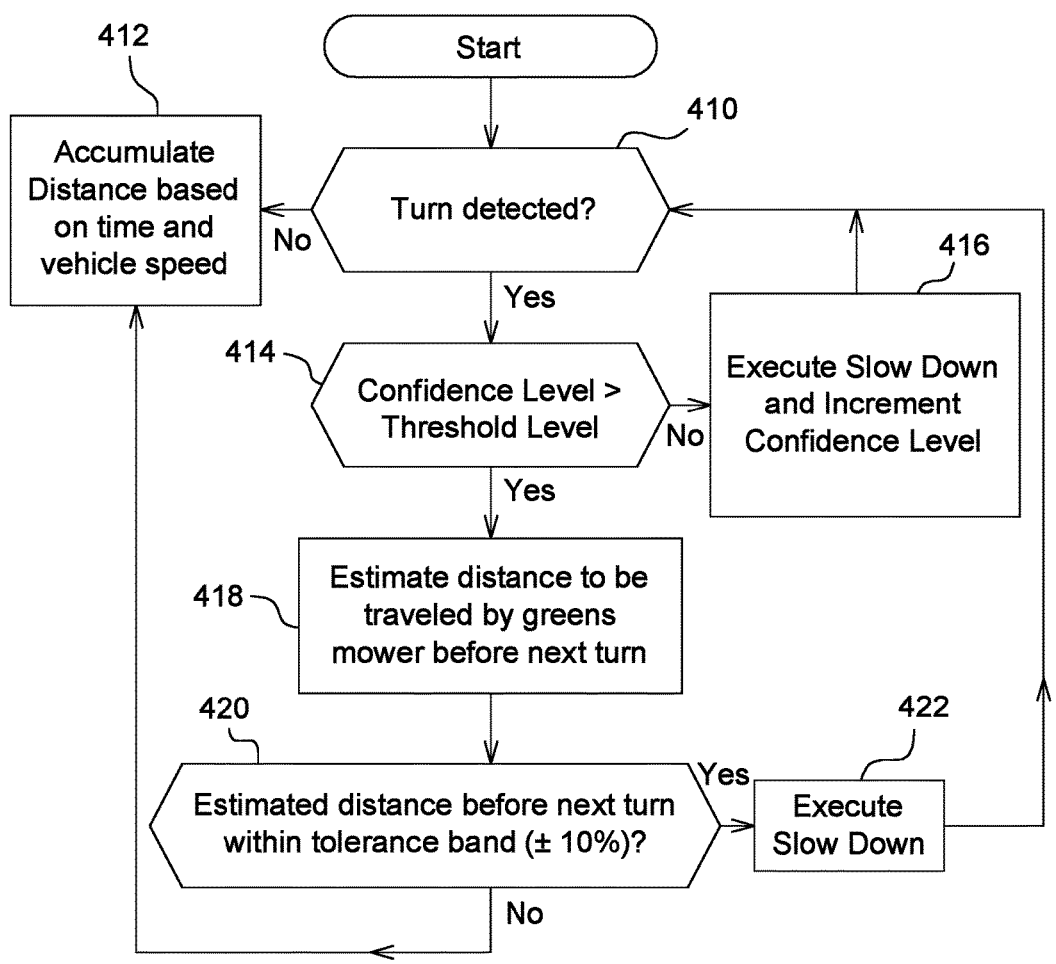
FIG. 10 is a logic diagram for a confidence level algorithm of a slow down system on an electric walk behind greens mower according to one embodiment of the invention.

In one embodiment, electric walk behind greens mower 100 may have an automatic slow down system that includes a confidence level algorithm that the electronic control unit may use to ignore current or accelerometer spikes if there is a high confidence level that the greens mower is not near the edge of a green. The electronic control unit may run the confidence level algorithm only when the cutting reels are spinning and/or the PTO switch is on. The electronic control unit may have software and/or logic to record the distance and/or time travelled for each successive pass across the green. FIG. 10 is a logic diagram for the confidence level algorithm. In block 410, the electronic control unit may determine if a turn is detected by the current sensors and/or accelerometers described above. If a turn is not detected, the electronic control unit may continue to accumulate and record the distance and/or time for the pass across the green in block 412. If a turn is detected, the electronic control unit may determine if the confidence level is above a threshold level in block 414. If the confidence level is not above a threshold level, the electronic control unit may execute the slow down and increment the confidence level in block 416. For example, the confidence level may start at zero percent on the first pass across a green. The electronic control unit may increment the confidence level by a fixed or variable value each time a turn is detected. The confidence level may approach a threshold level such as 80% and have a maximum of 100%. In block 418, if the confidence level is above the threshold level, the electronic control unit may estimate the distance or time to be traveled during the pass until a turn, based on stored distance or time data. In block 420, the electronic control unit may determine if the estimated distance or time until the turn is within a tolerance band such as plus or minus 10%. If the estimated distance until the turn is within the tolerance band, the electronic control unit may execute the slow down in block 422. If the estimated distance until the next turn is outside the tolerance band, the electronic control unit may maintain the same traction speed and continue to accumulate distance and time for the pass in block 412.

In a third alternative embodiment shown in FIG. 2C, the electric walk behind greens mower may have an automatic slow down system including one or more touch sensors 199 on the handle that provide electronic signals to the electronic control unit. The alternative automatic slow down system may slow down the traction motor without lifting or pitching of the reel mower cutting unit. The touch sensors 199 may be signal connected to the electronic control unit to provide signals for slowing down the traction drive. Alternatively, the system may include pairs of touch sensors. For example, the system may include a touch sensor on the left side of the handle to slow down the left side of the traction drum, and a touch sensor on the right side of the handle to slow down the right side of the traction drum.

Figure 11:
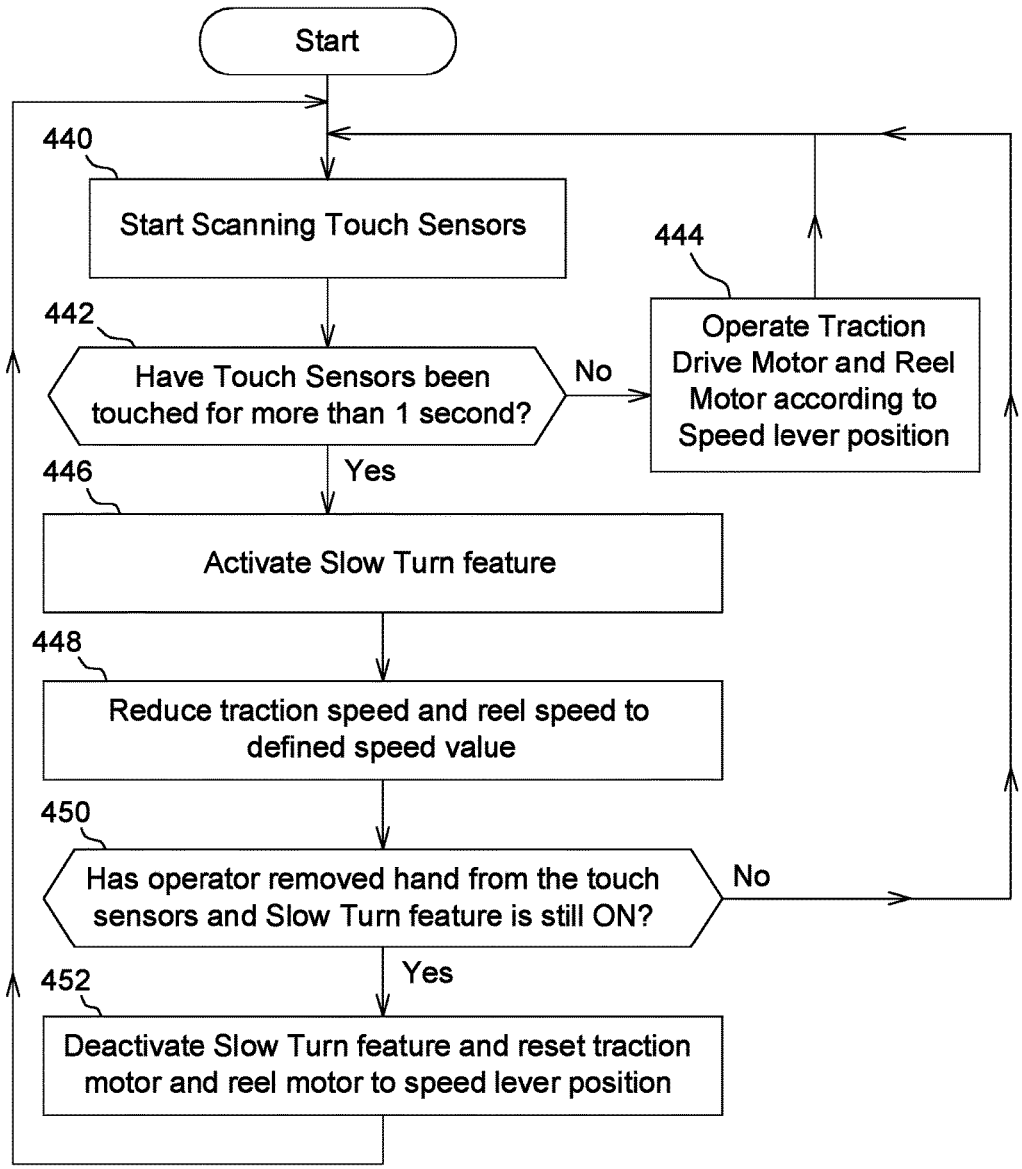
FIG. 11 is a logic diagram of an automatic slow down system using touch sensors on the handle of an electric walk behind greens mower according to a third embodiment of the invention.

As shown in the logic diagram of FIG. 11, in block 440, the electronic control unit may start scanning the touch sensors while the traction drive is running and the electric walk behind greens mower is in the mow or transport mode. In block 442, the electronic control unit may determine if signals from the touch sensors indicate they have been touched for more than 1 second. For example, at the end of each pass across a green, when turning around the mower, the operator may contact the touch sensor. In block 444, if the touch sensors have not been touched for more than 1 second, the electronic control unit may signal the traction drive to continue operating the mower based on the throttle position. If the electronic control unit determines the touch sensors have been touched for more than 1 second, the electronic control unit then may activate the slow turn feature in block 446. In response to the signals from the touch sensors for more than 1 second, the electronic control unit may command the traction motor controllers or actuators to reduce the traction speed by a defined speed value or ratio, such as 40%, in block 448. In block 450, the electronic control unit may determine if the operator has removed his or her hand from the touch sensors and the slow turn feature is still on. If the operator's hand has not been removed from the touch sensors, the electronic control unit may return to block 440. If the operator's hand has been removed from the touch sensors, in block 452 the electronic control unit may deactivate the slow turn feature, and provide commands to the traction motor controller or actuators to reset the traction speed to the earlier speed value based on the throttle position. Thus, once the turn is complete, the operator may remove his hands from the touch sensor and provide a signal to the electronic control unit to command the traction motor to return to the initial traction speed.

In an alternative embodiment, the touch sensors on the mower handle may be used to slow down the traction drive of an electric walk behind greens mower powered by an internal combustion engine or other non-electronic power source. For example, the touch sensors may be mechanically connected; i.e., with cables; to an actuator; i.e., an electric linear solenoid actuator. The mechanical connections and actuator may be connected to a throttle which may be used to reduce the speed of the engine by a specified amount, or may apply brakes to slow the output shaft or differential of the engine. Once the turn is complete, the operator may remove his hands from the touch sensor. The mechanical connections, actuator and/or throttle may be biased to return to the initial traction speed position.

Having described the preferred embodiment, it will become apparent that various modifications can be made without departing from the scope of the invention as defined in the accompanying claims.

The invention claimed is:

1. An electric walk behind greens mower, comprising:
   an electric reel motor rotating a cutting reel;
   an electric traction motor rotating at least one traction drive roller; and
   an electronic control unit commanding the electric traction motor and the electric reel motor to rotate at reduced speeds during a turn around if the electronic control unit receives a first electronic signal compared to a threshold value indicating a deviation from a normal walk speed.

2. The electric walk behind greens mower of claim 1 wherein the first electronic signal is a current spike from the electric traction motor.

3. The electric walk behind greens mower of claim 1 wherein the first electronic signal is a spike from an accelerometer mounted on the electric walk behind greens mower.

4. The electric walk behind greens mower of claim 1 wherein the first electronic signal is from a touch sensor on a handle of the electric walk behind greens mower.

5. The electric walk behind greens mower of claim 1 wherein the electronic control unit includes a confidence level algorithm that ignores the first electronic signal indicating a deviation from the normal walk speed if there is a high confidence level that the electric walk behind greens mower is not at an edge of a green.

6. The electric walk behind greens mower of claim 1 wherein the electronic control unit includes a timer for limiting how long the electric traction motor and the electric reel motor rotate at the reduced speeds.

7. The electric walk behind greens mower of claim 1 wherein the electronic control unit includes an angle sensor providing a second electronic signal to the electronic control unit indicating if the turn around is complete.

8. The electric walk behind greens mower of claim 1 wherein the electronic control unit provides commands to the electric traction motor and the electric reel motor to rotate at the reduced speeds via a CAN bus.

9. An electric walk behind greens mower, comprising:
   an electric reel motor rotating a cutting reel;
   an electric traction motor rotating at least one traction drive roller; and
   an electronic control unit determining if an actual speed of the electric traction motor is substantially less than a speed specified by a speed lever when the speed lever changes position, and then commanding the electric reel motor and the electric traction motor to rotate at a lower speed than specified by the speed lever.

10. The electric walk behind greens mower of claim 9 wherein the electronic control unit commands the electric reel motor and the electric traction motor to ramp up their rotational speeds in a plurality of steps toward the speed specified by the speed lever.

11. The electric walk behind greens mower of claim 9 wherein the electronic control unit commands the electric traction motor not to start rotating unless the speed lever is in a slow speed position below a low threshold.

* * * * *